(12) United States Patent
Shimada et al.

(10) Patent No.: US 10,063,058 B2
(45) Date of Patent: Aug. 28, 2018

(54) POWER CONVERTER

(71) Applicant: Hitachi Information & Telecommunication Engineering, Ltd., Yokohama-shi, Kanagawa (JP)

(72) Inventors: Takae Shimada, Tokyo (JP); Fumikazu Takahashi, Yokohama (JP); Kimiaki Taniguchi, Yokohama (JP); Kosuke Abe, Yokohama (JP)

(73) Assignee: Hitachi Information & Telecommunication Engineering, Ltd., Kanagawa (JP)

( * ) Notice: Subject to any disclaimer, the term of this patent is extended or adjusted under 35 U.S.C. 154(b) by 0 days.

(21) Appl. No.: 15/457,179

(22) Filed: Mar. 13, 2017

(65) Prior Publication Data

US 2017/0279279 A1    Sep. 28, 2017

(30) Foreign Application Priority Data

Mar. 25, 2016  (JP) ................. 2016-061660

(51) Int. Cl.
*H02M 7/537*   (2006.01)
*H02J 3/38*    (2006.01)
*H02M 3/158*   (2006.01)
*H02M 7/515*   (2007.01)

(52) U.S. Cl.
CPC ............. *H02J 3/385* (2013.01); *H02J 3/387* (2013.01); *H02M 3/158* (2013.01); *H02M 7/537* (2013.01); *H02M 7/515* (2013.01)

(58) Field of Classification Search
CPC . H02M 2007/4803; H02M 2007/4822; H02M 7/42; H02M 7/48; H02M 7/487; H02M 7/493; H02M 7/501; H02M 7/4826; H02M 7/49; H02M 7/4807; H02M 7/537; H02M 7/538; H02M 2003/1586; H02M 3/1584
USPC ..... 363/97, 98, 131, 132, 65, 71, 72, 35–37, 363/135, 136, 137
See application file for complete search history.

(56) References Cited

U.S. PATENT DOCUMENTS

2015/0200603 A1* 7/2015 Nam ................... H02M 5/4585
  363/37
2015/0349583 A1* 12/2015 Yamada ................... G05F 1/67
  307/46

FOREIGN PATENT DOCUMENTS

JP    2011-141794 A    7/2011

* cited by examiner

*Primary Examiner* — Timothy J Dole
*Assistant Examiner* — Bryan R Perez
(74) *Attorney, Agent, or Firm* — Mattingly & Malur, PC

(57) ABSTRACT

A power converter includes a plurality of converters which are connected in parallel to a DC power supply in which an operating point is changed in accordance with an output current or an output voltage. The plurality of converters include maximum power point tracking units for performing maximum power point tracking calculations of the DC power supply. Results of the maximum power point tracking calculations of the plurality of converters are unified between the plurality of converters and the plurality of converters are controlled based on the unified calculation result.

9 Claims, 7 Drawing Sheets

FIG. 4

|  | Case1 | Case2 | Case3 | Case4 | Case5 | Case6 |
|---|---|---|---|---|---|---|
| Result1 | −1 | −1 | −1 | +1 | −1 | −1 |
| Result2 | −1 | −1 | +1 | +1 | +0.1 | +1 |
| Result3 | −1 | +1 | +1 | +1 | +0.2 |  |
| Result | − | − | + | + | − | Reverse |

POWER CONVERTER

The present application claims priority from Japanese application serial no. 2016-61660, filed on Mar. 25, 2016, the content of which is hereby incorporated by reference into this application.

BACKGROUND OF THE INVENTION

Field of the Invention

The present invention relates to a power converter in which a plurality of converters are connected in parallel.

Description of Prior Art

In recent years, from growing awareness of global environmental conservation, a system including a distributed power supply such as a solar cell and a fuel cell has been developed. In general, a power converter that is used for a solar power generation system includes a maximum power point tracking (MPPT) control device that maximizes power input from the solar cell.

As related art, a power converter in which a plurality of power converters are connected in parallel to configure further large power converter is disclosed in JP-A-2011-141794. In the power converter, one power converter performs the maximum power point tracking control and the other power converters perform a current control. Therefore, it is possible to perform the current control such that a current uniformly flows through each power converter while performing the maximum power point tracking control.

In the power converter disclosed in JP-A-2011-141794, since one power converter performs the maximum power point tracking control, in a case where a trouble such as a failure occurs in the power converter, it is difficult to perform the maximum power point tracking control and there is a problem that reliability is lowered.

SUMMARY OF THE INVENTION

Then, an object of the invention is to provide a power converter in which a plurality of converters are connected in parallel and which has high reliability.

In order to solve the problem, a power converter according to an aspect of the invention includes a plurality of converters that are connected in parallel to a DC power supply of which an operating point is changed in accordance with an output current or an output voltage. The plurality of converters include maximum power point tracking units for performing a maximum power point tracking calculation of DC power supply. Results of the maximum power point tracking calculation of the plurality of converters are unified between the plurality of converters and the plurality of converters are controlled based on a unified calculation result.

According to the invention, the plurality of converters include the maximum power point tracking units and the plurality of converters are controlled by the result that is obtained by unifying the results of the maximum power point tracking calculation of the plurality of converters. Therefore, in the power converter in which the plurality of converters are connected in parallel, reliability of the maximum power point tracking control is improved.

Objects, configurations, and effects other than those described above will become apparent from the following description of embodiments.

BRIEF DESCRIPTION OF THE DRAWINGS

FIG. 4 is a diagram illustrating a calculation result in each DC-DC converter and a unification result that is determined based on the calculation result.

DETAILED DESCRIPTION OF THE INVENTION

Figure 1:
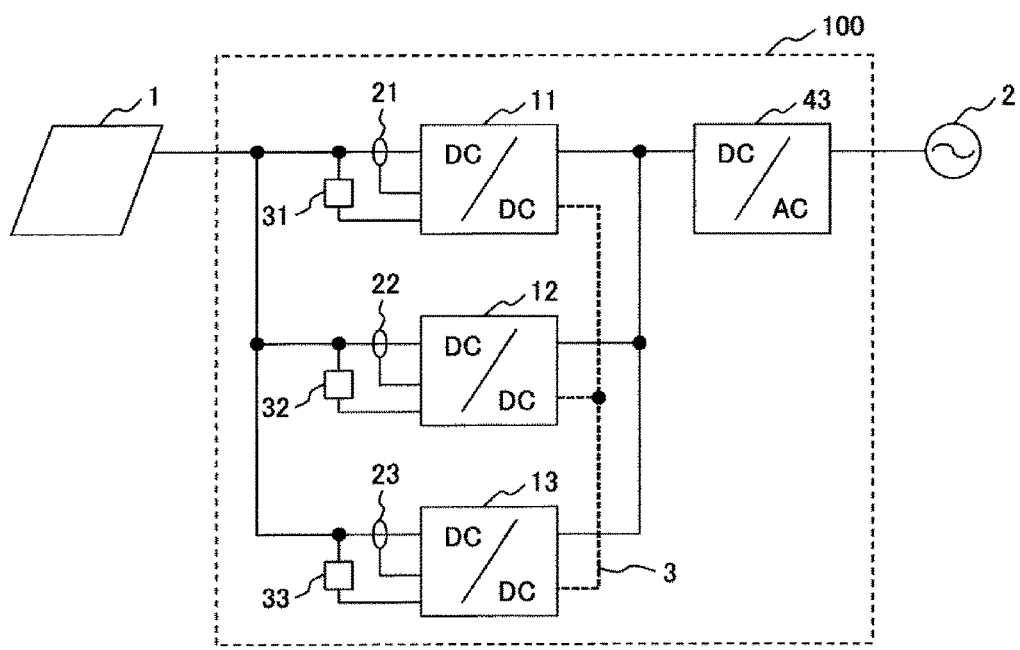
FIG. 1 is a schematic configuration diagram of a power converter of Embodiment 1 of the invention.

Hereinafter, embodiments of the invention will be described with reference to the drawings.

In each figure, the same reference numerals indicate the same configuration elements or configuration elements having similar functions.

Embodiment 1

FIG. 1 is a schematic configuration diagram of a power converter of Embodiment 1 of the invention.

As illustrated in FIG. 1, a DC power is input into a power converter 100 from a solar cell 1 and the power converter 100 outputs an AC power to an AC system 2. The power converter 100 includes DC-DC converters 11 to 13 which are connected in parallel, an inverter 43 which is connected to ends thereof, current sensors 21 to 23 which respectively detect input currents of the DC-DC converters 11 to 13, voltage sensors 31 to 33 which detect input voltages, a communication line 3 for communicating between the DC-DC converters 11 to 13.

The DC-DC converters 11 to 13 include the maximum power point tracking (hereinafter, referred to as MPPT) control units that control a voltage and a current that are an operating point of the solar cell 1 so as to take out a maximum power from the solar cell 1. The DC-DC converters 11 to 13 supply the DC power to the inverter 43. In addition, the DC-DC converters 11 to 13 include current share control units for balancing the input current into each DC-DC converter. The inverter 43 converts the DC power supplied from the DC-DC converters 11 to 13 into the AC power and outputs the AC power to an AC system 2.

In general, in the solar cell, if a voltage is lowered, a current is increased and if the current is reduced, the voltage is increased. However, for power that is a product of a voltage and a current, a voltage and a current by which the power becomes the maximum are present. In the MPPT control, for example, the current of the solar cell is changed, it is determined whether the power is increased or decreased after an MPPT cycle of 0.1 second to substantially several seconds, and then the current is decreased or increased based on an MPPT calculation result which is obtained by determining whether the current is decreased or increased. For example, when the current is decreased, in a case where the power is increased, the current is further decreased and, in a case where the power is decreased, reversely, the current is increased. Such a process is performed for each MPPT control cycle and thereby the power input from the solar cell becomes the maximum.

In the power converter 100, the DC-DC converters 11 to 13 which are connected in parallel cooperatively perform the MPPT control and operate to maximize the power input from the solar cell 1. Specifically, it is determined whether the input power of each of the DC-DC converters 11 to 13 is increased or decreased using the current sensors 21 to 23 and the voltage sensors 31 to 33, and the MPPT calculation result is obtained. Here, the MPPT calculation result is information for increasing the input power of each of the DC-DC converters 11 to 13 and, for example, is information whether the input current is to be increased or to be decreased.

Next, the MPPT calculation result of each of the DC-DC converters 11 to 13 is shared between the DC-DC converters 11 to 13 using the communication line 3 and the MPPT calculation results are unified. Then, the switching element provided in each of the DC-DC converters 11 to 13 is controlled and, for example, the input current of each of the DC-DC converters 11 to 13 is changed based on the unified MPPT calculation result. As described above, each of the DC-DC converters 11 to 13 is operated so as to maximize the input power of each of the DC-DC converters 11 to 13. The MPPT control is performed such that the operating point of the solar cell 1 is optimized and the input power from the solar cell 1 is maximized.

Moreover, besides, the MPPT calculation result may be information regarding whether the input power is increased or decreased, information regarding whether the input voltage is increased or decreased, information regarding an input and output voltage ratio is increased or decreased, information regarding whether an ON duty ratio of the switching elements provided in the plurality of converters is increased or decreased, and the like.

Here, a configuration of the DC-DC converter that is operated as described above will be described.

Figure 2:
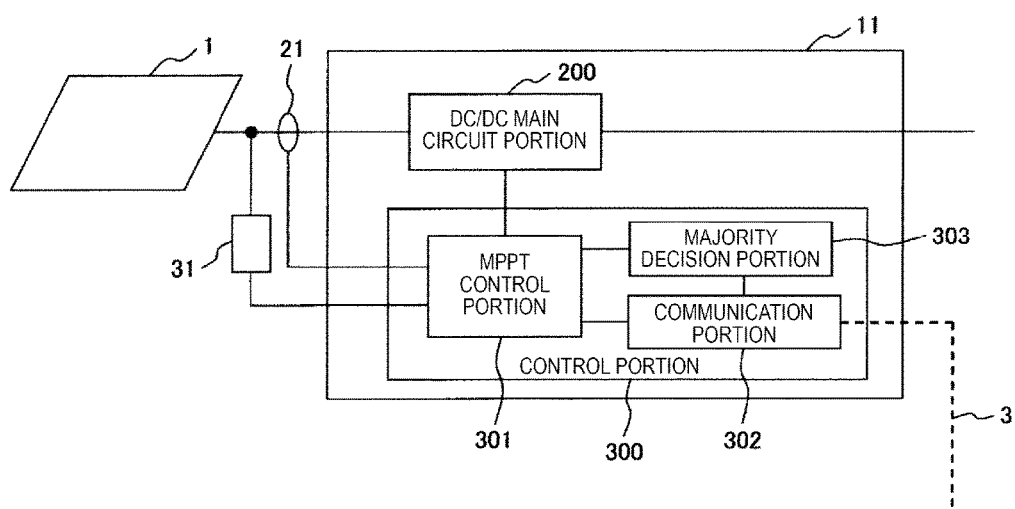
FIG. 2 is a functional block diagram illustrating a circuit configuration of a DC-DC converter.

FIG. 2 is a functional block diagram illustrating a circuit configuration of the DC-DC converter. The configuration of the DC-DC converter 11 in FIG. 1 is illustrated in FIG. 2 and configurations of the other DC-DC converters 12 and 13 are also the same as each other.

As illustrated in FIG. 2, a DC/DC main circuit portion 200 converts the input power from the solar cell 1 by ON/OFF of a semiconductor switching element and outputs the converted power. Moreover, as the semiconductor switching element, a Metal Oxide Semiconductor Field Effect Transistor (MOSFET), an Insulated Gate Bipolar Transistor (IGBT), and the like are used. ON/OFF of the semiconductor switching element in the DC/DC main circuit portion 200 is controlled by a control portion 300. Moreover, an operation processing device such as a microcomputer executes a predetermined program and thereby the control portion 300 functions as a control unit including an MPPT control portion 301, a communication portion 302, and a majority decision portion 303 which are described below.

The MPPT control portion 301 in the control portion 300 performs the MPPT control based on a value of the input current to the DC/DC main circuit portion 200 which is detected by the current sensor 21 and a value of the input voltage input into the DC/DC main circuit portion 200 which is detected by the voltage sensor 31. That is, the MPPT control portion 301 controls the DC/DC main circuit portion 200 so as to change the input current by a predetermined amount, and measures the input power (output power of the solar cell 1) from the input current and the input voltage.

The MPPT control portion 301 compares a measured input power and input power which is measured and stored before the change of the input current. In a case where it is determined that the measured input power is increased, if the increase of the input power is caused by the increase of the input current, the MPPT control portion 301 determines that the input current is increased at the next time and if the increase of the input power is caused by the decrease of the input current, the MPPT control portion 301 determines that the input current is decreased at the next time. In addition, in a case where the MPPT control portion 301 determines that the measured input power is decrease, if the decrease of the input power is caused by the increase of the input current, the MPPT control portion 301 determines that the input current is decrease at the next time and, if the decrease of the input power is caused by the decrease of the input current, the MPPT control portion 301 determines that the input current is increased at the next time.

The MPPT control portion 301 outputs a determination result regarding a change of the input power at the next time as the calculation result as described above. The output calculation result is transmitted to the other DC-DC converters 12 and 13 (FIG. 1) by the communication portion 302 via the communication line 3. In addition, the calculation result of the MPPT control portion 301 is transmitted to the majority decision portion 303 described below.

The communication portion 302 transmits the calculation result of the MPPT control portion 301 to the other DC-DC converters 12 and 13 (FIG. 1), the other DC-DC converters 12 and 13 (FIG. 1) receive the calculation result of the MPPT control portion, and the received calculation result is transmitted to the majority decision portion 303.

The majority decision portion 303 outputs a unification result which is unified in any one of the increase and the decrease in respect of the increase or the decrease of the input current of each of the DC-DC converters 11, 12, and 13 by majority decision processing described below based on the calculation result of the MPPT control portion 301, that is, a self calculation result regarding the change of the input current of the DC-DC converter 11 and the calculation results of the other DC-DC converters 12 and 13 transmitted from the communication portion 302.

In addition, the same unification result as that of the DC-DC converter 11 is obtained by the same majority decision processing also in the DC-DC converters 12 and 13. Therefore, in each of the DC-DC converters 11, 12, and 13, the change of the input current is any one of the increase and the decrease.

The MPPT control portion 301 controls the DC/DC main circuit portion 200 so as to change the input current in accordance with the unification result output by the majority decision portion 303.

Moreover, the control portion 300 includes a current share control portion for balancing the input current to each DC-DC converter. In FIG. 2, since the current share control portion is included in the MPPT control portion 301, the current share control portion is not illustrated. An example of an operation of the current share control portion is as follows.

The current share control portion transmits a value of the input current detected by the current sensor 21 to the other DC-DC converters 12 and 13 (FIG. 1) by using the communication portion 302 via the communication line 3. The communication portion 302 transmits the value of the input current into the DC-DC converter 11 to the other DC-DC converters 12 and 13 (FIG. 1) and receives the values of the input currents of the other DC-DC converters 12 and 13 (FIG. 1).

The current share control portion calculates the input current that is detected by the current sensor 21, that is, the value of a self input current of the DC-DC converter 11, and a received average value (for example, an arithmetic average value) of the values of the input current of the other DC-DC converters 12 and 13 (FIG. 1). The calculated average value is a current command value. Then, the current control portion performs the current control such that the value of the input current which is detected by the current sensor 21 matches the current command value. Each DC-DC converter performs the same current control and thereby it is possible to balance the input current into each DC-DC converter. Therefore, in the embodiment, even if the input current of each DC-DC converter is changed by the MPPT control at once, it is possible to prevent troubles in the DC-DC converter, such as a decrease of a service life and an occurrence of failure, caused by an increase of the input current shared by a part of the DC-DC converters.

Figure 3:
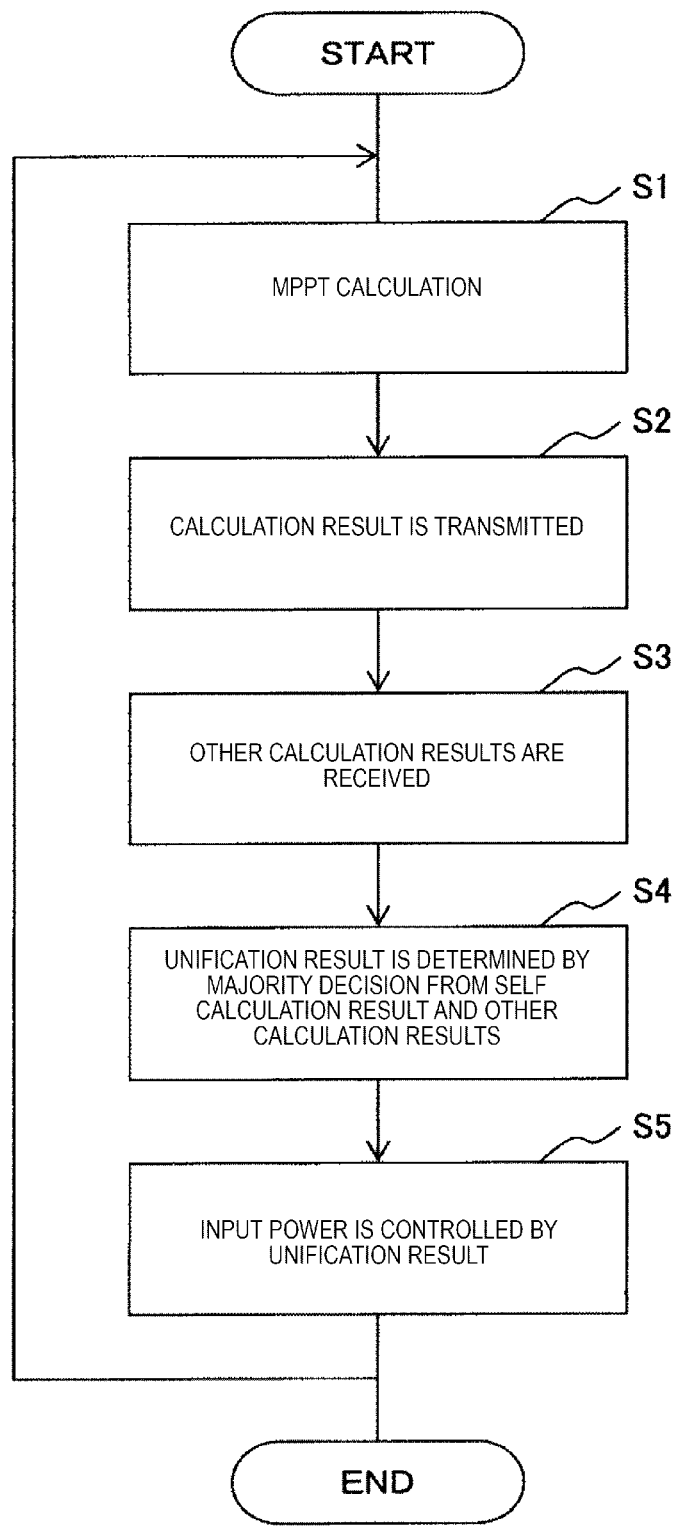
FIG. 3 is a flow chart illustrating an example of a flow of a processing operation in a control portion of FIG. 2.

FIG. 3 is a flow chart illustrating an example of a flow of a processing operation in the control portion 300 of FIG. 2. Moreover, details of individual processing operation are the same as those described above.

If the operation of the DC-DC converter is started, the MPPT calculation is performed (step S1).

Next, the MPPT calculation result (self calculation result) is transmitted to the other DC-DC converters (step S2).

Next, the calculation results (other calculation results) of the other DC-DC converters are received (step S3).

Next, the unification result, which is unified in any one of the increase and the decrease of the input current, is determined by the majority decision from the self calculation result and the other calculation results received in step S3 (step S4).

Next, the input current is increased or decreased by the unification result determined in step S4 and the input power is controlled (step S5).

Moreover, the processing operation described above is repeatedly performed at a predetermined MPPT control cycle during the operation of the DC-DC converter.

Next, a specific operation of the majority decision portion 303 of FIG. 2, that is, a unit for unifying a plurality of MPPT calculation results will be described with reference to FIG. 4.

FIG. 4 illustrates a calculation result in each DC-DC converter and a unification result that is determined based on the calculation result.

In FIG. 4, Result 1, Result 2, and Result 3 respectively indicate the MPPT calculation results of the DC-DC converter 11, the DC-DC converter 12, and the DC-DC converter 13. For the Results 1 to 3, "+1" indicates that the next input current is increased and "−1" indicates that the next input current is decreased. In addition, Result in FIG. 4 is the unified MPPT calculation result that is determined on the basis of Result 1 to Result 3. For the Result, "+" indicates that the next input current is increased, and "−" indicates that the next input current is decreased.

As indicated by Case 1 to Case 4 in FIG. 4, the Result is determined to the majority in the MPPT calculation results of Result 1 to Result 3 in the change of the input current. That is, the unification result is determined by the majority decision based on the MPPT calculation results of the DC-DC converters 11, 12, and 13.

As indicated in Case 5, a linear region is provided between +1 and −1 of Result 1 to Result 3 and the number of the calculation results required to provide the unification result by the majority decision, that is, the number of the DC-DC converters may be different in a case where the input current is increased and a case where the input current is decreased. In this case, the MPPT calculation result is unified by positive and negative of a total value of Result 1 to Result 3.

In the DC-DC converters 11, 12, and 13, an efficiency of an entire power converter may be increased if the number of operating units is reduced in a light load state in which the input power from the solar cell 1 is small. For example, the DC-DC converter 13 is paused, as indicated by Case 6, Result 1 and Result 2 are unified and in a case where the number of the MPPT calculation results of +1 and −1 is equal, the unification result Result is obtained by reversing (Reverse) polarities of the MPPT calculation result (Result) which is unified by the MPPT calculation of the last time. Therefore, the operating point of the solar cell 1 is relatively easily stayed in an optimal operation point in which the maximum output is obtained. Additionally, in a case where the number of the MPPT calculation results of +1 and −1 is equal, as described above, it is not limited to the unification means of the MPPT results and it may be unified to any one of "+" (increase of the input current) and "−" (decrease of the input current). Moreover, the unification means is not limited to a case where a part of the DC-DC converters is paused and can be applied to a case where the calculation results of the even number of the DC-DC converters are unified. According to Embodiment 1 described above, even if any one of a plurality of DC-DC converters is failed, it is possible to continue the MPPT control in the remaining DC-DC converters. Therefore, reliability of power converter in which the plurality of DC-DC converters are connected in parallel is improved.

In Embodiment 1, each of the plurality of DC-DC converters which are connected in parallel has the control function of unifying the MPPT calculation results, but is not limited to this. At least two DC-DC converters may have the control function, and then the DC-DC converter having the control function and the DC-DC converter having no control function may be mixed in the converters. In this case, the unified MPPT calculation result is transmitted from the DC-DC converter having the control function to the DC-DC converter having no control function.

In addition, in Embodiment 1, any one of the DC-DC converters may be a master, and then the master unifies the MPPT calculation results and the unification result are transmitted to the other DC-DC converters. In a case where the master is failed, the highest DC-DC converter of the order is a new master in accordance with the master setting priority order that is set in advance and the new master unifies the MPPT calculation results of the DC-DC converters.

In addition, a control portion may be provided separately from the DC-DC converter, and then the control portion obtains the MPPT calculation result from each DC-DC converter, determines the unification result, and transmits the determined unification result to each DC-DC converter. Also, in this case, even if any one of the plurality of DC-DC converters is failed, it is possible to continue the MPPT control by the unification result. If a plurality of control portions are provided and namely redundancy is provided, the reliability is improved.

Figure 5:
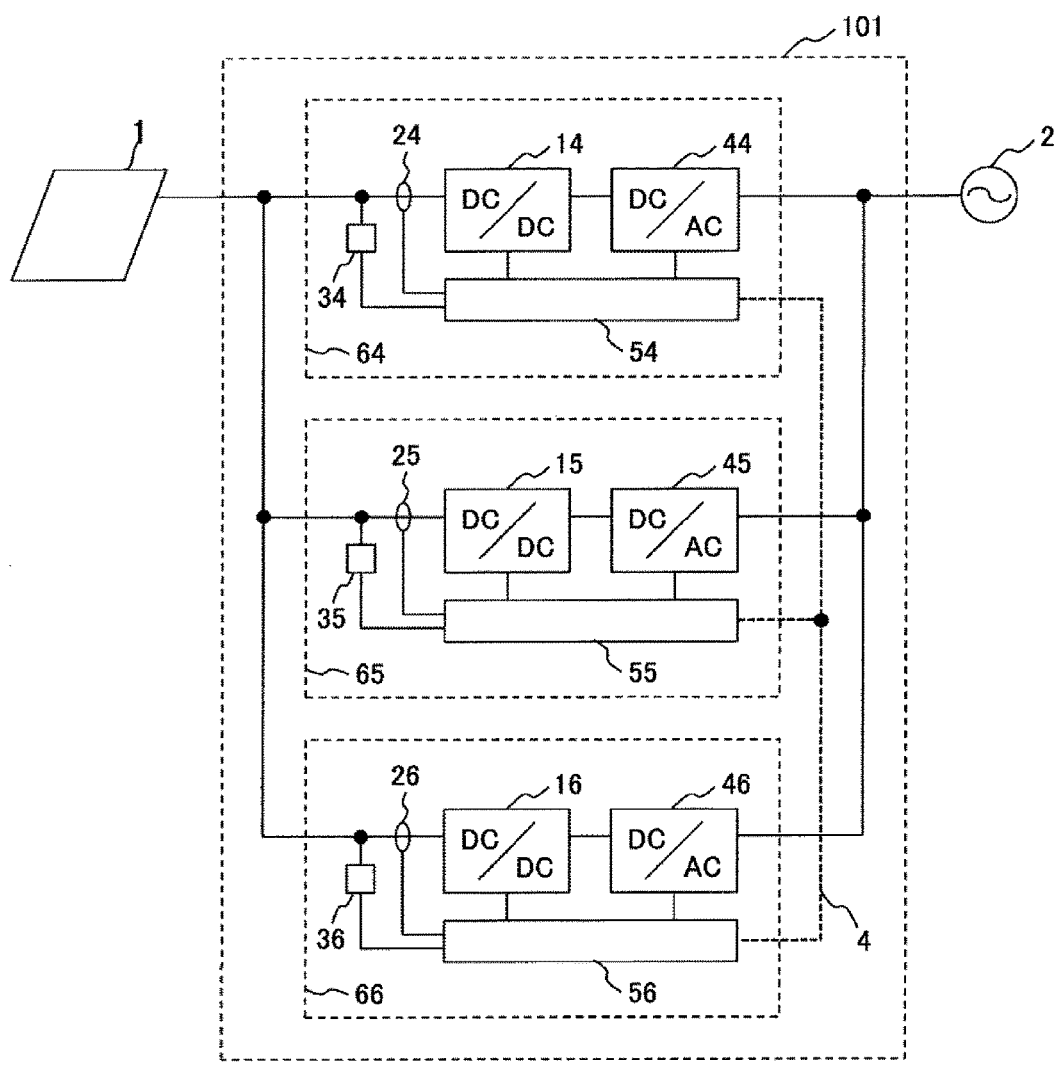
FIG. 5 is a schematic configuration diagram of a power converter of Embodiment 2 of the invention.

In addition, two or more DC-DC converters or the converters in FIG. 5 perform the MPPT calculation and the DC-DC converter or the converter which does not perform the MPPT calculation may be included among the plurality of the DC-DC converters or the converters. In this case, the unification result is determined between the DC-DC converters or the converters performing the MPPT calculation and the determined unification result is transmitted to the DC-DC converter or the converter which does not perform the MPPT calculation. The DC-DC converter or the converter which does not perform the MPPT calculation performs the power control by a control command which is created based on the unification result.

Embodiment 2

FIG. 5 is a schematic configuration diagram of a power converter of Embodiment 2 of the invention.

As illustrated in FIG. 5, a DC power is input into a power converter 101 from a solar cell 1 and the power converter 101 outputs an AC power to an AC system 2. The power converter 101 includes converters 64 to 66 which are connected in parallel and a communication line 4 for communicating between the converters 64 to 66. The converters 64 to 66 respectively include DC-DC converters 14 to 16, inverters (DC-AC converters) 44 to 46 which are connected rear stages thereof, current sensors 24 to 26 which detect an input current of each of the converters 64 to 66, voltage sensors 34 to 36 which detect the input voltages, and control portions 54 to 56.

The control portions 54 to 56 of the converters 64 to 66 include MPPT control portions for taking out a maximum power from the solar cell 1. The MPPT calculation is performed to maximize the input power of each of the converters 64 to 66, and then the MPPT calculation results are respectively unified and the unified MPPT calculation result is reflected on each of the converters 64 to 66, same as that of the power converter 100 of Embodiment 1.

Moreover, in the power converter 101 of Embodiment 2, semiconductor switching elements included in DC-DC converters 14 to 16 may be controlled or semiconductor switching elements included in the inverters 44 to 46 may be controlled based on the unified MPPT calculation result. Moreover, in a case where an output of the solar cell 1 can be directly input into the inverter (DC-AC converter), the DC-DC converters 14 to 16 may be omitted.

Figure 6:
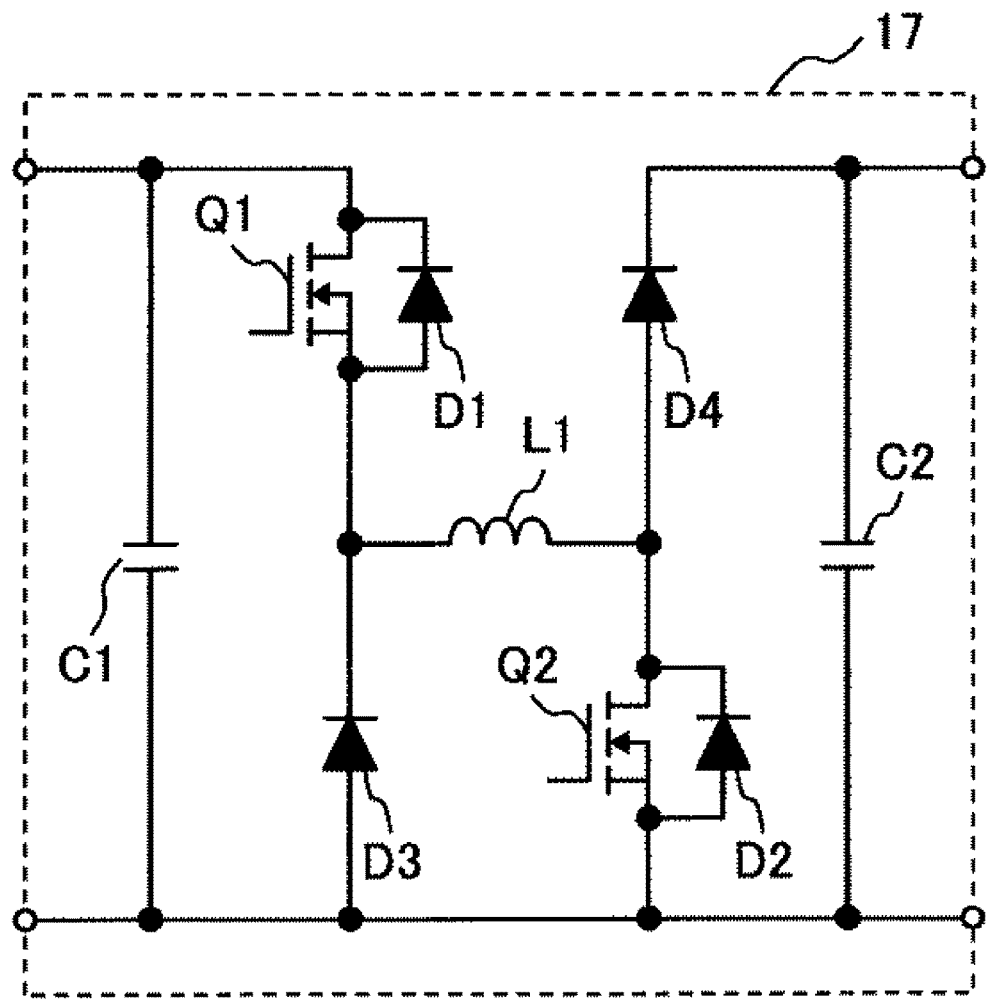
FIG. 6 is an example of a circuit configuration of the DC-DC converter.

FIG. 6 illustrates an example of a circuit configuration of the DC-DC converters 14 to 16.

As illustrated in FIG. 6, each of the DC-DC converters 14 to 16 can be configured of an H-bridge circuit 17. Power input into both ends of a capacitor C1 is output from both ends of a capacitor C2 by controlling ON and OFF of semiconductor switching elements (MOSFET in FIG. 6) Q1 and Q2 in the H-bridge circuit 17.

Each of the DC-DC converters 14 to 16 may be configured of a boost chopper circuit and an isolation-type DC-DC converter in addition to the H-bridge circuit.

Figure 7:
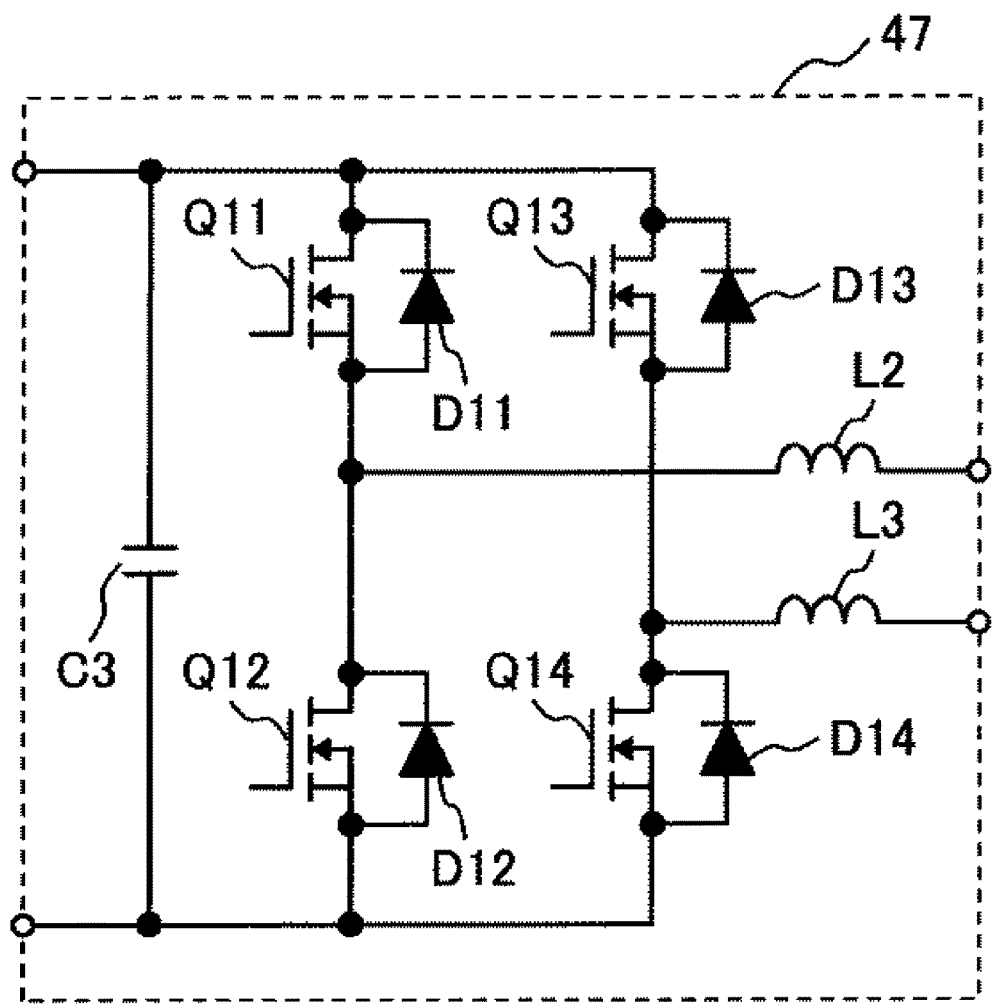
FIG. 7 is an example of a circuit configuration of an inverter.

FIG. 7 illustrates an example of a circuit configuration of the inverters 44 to 46.

As illustrated in FIG. 7, each of the inverters 44 to 46 can be configured of a full bridge circuit 47. The DC power input into both ends of a capacitor C3 is converted into the AC power and output by controlling ON and OFF of semiconductor switching elements (MOSFET in FIG. 6) Q11 to Q14 in the full bridge circuit 47.

Each of the inverters 44 to 46 may be configured of a three-phase inverter circuit or a single-phase three-wire inverter circuit in addition to the full bridge circuit.

As described above, according to Embodiment 2, since the converters 64 to 66 respectively include the DC-DC converters 14 to 16 and the inverters 44 to 46, it is possible to easily increase power conversion capacity by adding converters after providing the power converter 101.

In addition to the solar cell, the MPPT control described above according to the invention can be applied to a DC power supply in which an operating point (current and voltage) is changed and an output power is changed in accordance with an output current or an output voltage. As such a DC power supply, there is a fuel cell in addition to the solar cell.

Moreover, the invention is not limited to the embodiments described above and includes various modifications. For example, the embodiments described above are those which are described in detail in order to better illustrate the invention and are not necessarily intended to be limited to ones which include the described entire configurations. In addition, it is possible to add, delete, and replace other configurations to a part of the configurations of each of the embodiments.

For example, in the MPPT control, the maximum power point may be obtained by changing in the input voltage. In addition, the MPPT control may be performed to maximize each output power of the plurality of DC-DC converters (FIGS. 1 and 5) and the input power or the output power of the plurality of inverters (FIG. 5).

What is claimed is:

1. A power converter comprising:
a plurality of converters that are connected in parallel to a DC power supply of which an operating point is changed in accordance with an output current or an output voltage,
wherein the plurality of converters include maximum power point tracking units for performing a maximum power point tracking calculation of DC power supply, and
wherein results of the maximum power point tracking calculation of the plurality of converters are unified between the plurality of converters and the plurality of converters are controlled based on a unified calculation result,
a majority decision unit that unifies the result of the maximum power point tracking calculation by a majority decision,
wherein the result of the maximum power point tracking calculation has information for maximizing an input power or an output power of each converter,
wherein the information for maximizing the input power or the output power of each converter is any one of information regarding a change of input power of the plurality of converters, information regarding a change of an input current of the plurality of converters, information regarding a change of an input voltage of the plurality of converters, information regarding a change of an input and output voltage ratio of the plurality of converters, and information regarding a change of an ON duty ratio of a switching element provided in the plurality of converters, and
wherein the result of the maximum power point tracking calculation of the plurality of converters relates to a change of the one of the information and is unified in one of the increase and the decrease in the majority decision.

2. The power converter according to claim 1,
wherein the majority decision unit is a majority decision portion which is provided in each of the plurality of converters.

3. The power converter according to claim 2,
wherein the plurality of converters transmit the result of the maximum power point tracking calculation to the majority decision portion.

4. The power converter according to claim 1,
wherein the number of the converters which are operated among the plurality of converters is changed and the result of the maximum power point tracking calculation is unified between the operating converters in accordance with an input power amount of the DC power supply.

5. The power converter according to claim 1,
wherein in a case where the maximum power point tracking calculation of the plurality of converters result that the number of the increase and the decrease is same in respect of increase or decrease of any one of the informations, a unification result in a current control period is obtained by inverting a unification result of the maximum power point tracking calculation in a control period of the last time.

6. The power converter according to claim 1,
wherein the number of the calculation results necessary for the majority decision is different in the increase and the decrease.

7. The power converter according to claim 1,
wherein the plurality of converters perform the same current control with respect to the input current.

8. The power converter according to claim 1, wherein each of the plurality of converters includes DC-DC converter and an inverter.

9. The power converter according to claim 1,
wherein the DC power supply is a solar cell or a fuel cell.

* * * * *